United States Patent
Leon

[11] Patent Number: 5,283,547
[45] Date of Patent: Feb. 1, 1994

[54] SAFETY DEVICE FOR CYCLES

[76] Inventor: David P. Leon, Cotswold, 4 Holmemoor Drive, Sonning-on-Thames, Reading, Berkshire RG4OTE, England

[21] Appl. No.: 727,908

[22] Filed: Jul. 10, 1991

[30] Foreign Application Priority Data

Jul. 11, 1990 [GB] United Kingdom ............ 9015296.8
Apr. 27, 1991 [GB] United Kingdom ............ 9109165.2

[51] Int. Cl.$^5$ .................................. B62J 3/00
[52] U.S. Cl. .................................. 340/432; 362/72; 362/78
[58] Field of Search ............ 340/432; 362/72, 78, 362/301; 200/60, 61.45 R, 61.46, 80 R; 446/189, 204, 440; 116/137 R, 166

[56] References Cited

U.S. PATENT DOCUMENTS

| | | | |
|---|---|---|---|
| 1,839,591 | 1/1932 | Zimmerman | 446/189 |
| 2,367,430 | 1/1945 | Redlund | 446/440 |
| 3,781,082 | 12/1973 | Linder . | |
| 3,987,409 | 10/1976 | Freeman | 340/432 |
| 4,135,229 | 1/1979 | Modurkay | 362/72 |
| 4,176,390 | 11/1979 | Galbert | 340/432 |
| 4,323,879 | 4/1982 | Kelley | 340/432 |
| 4,575,789 | 3/1986 | Tsuyama | 362/72 |
| 4,725,928 | 2/1988 | Strepek | 362/78 |
| 4,787,014 | 11/1988 | Wodder et al. | 340/432 |
| 4,796,972 | 1/1989 | Thomas et al. | 340/432 |

FOREIGN PATENT DOCUMENTS

| | | | |
|---|---|---|---|
| 3021856 | 12/1981 | Fed. Rep. of Germany | 340/432 |
| 1508315 | 11/1967 | France . | |
| 434013 | 10/1967 | Switzerland . | |
| 2147694 | 5/1985 | United Kingdom | 340/432 |

*Primary Examiner*—Brent Swarthout
*Attorney, Agent, or Firm*—Finnegan, Henderson, Farabow, Garrett & Dunner

[57] ABSTRACT

A safety device for a cycle which may comprise a housing (1) with at least a translucent window provided therein, an electrical power supply (5) mounted within the housing, an electrical lamp (14) connected to the power supply via switch means (11), (12), one contact (11) of which is movable in response to rotary motion of the housing (1) into engagement with a fixed contact (12), and means (16), (17) provided on the housing (1) for attaching device to a least one spoke of a cycle wheel.

18 Claims, 3 Drawing Sheets

SAFETY DEVICE FOR CYCLES

BACKGROUND OF THE INVENTION

This invention relates to safety devices for cycles in the sense of making the presence of cycles, in use, more apparent to third party observers. Cyclists run the risk of not being seen at night time or whenever the ambient lighting conditions are poor, even when standard front and rear lamps are in use. Indeed, cyclists are often not seen in good daylight conditions. One particular vulnerability for cyclists, especially in poor lighting conditions, is that from the side, the front and rear lamps are not normally visible.

SUMMARY OF THE INVENTION

According to a first aspect of the present invention, there is provided a safety device for a cycle comprising a housing with at least a translucent window provided therein, an electrical power supply mounted within the housing, an electrical lamp connected to the power supply via switch means one contact of which is movable in response to rotary motion of the housing into engagement with a fixed contact, and means provided on the housing for attaching the device to a cycle wheel.

In use of the device, when the cycle wheel is rotated, the movable contact of the switch means automatically engages the fixed contact to close the switch and hence illuminate the lamp, the switch opening automatically as soon as the rotational speed of the wheel drops below a predetermined value. Thus, when the device is operative, a circle of light will automatically be generated around the hub of the wheel to which the device is fitted, the distance from the hub being dependent upon the position of the device on the wheel, whereby the presence of the cycle and cyclist will be much more readily observed by third parties and the safety of the cyclist accordingly improved. It will be appreciated that the safety of third parties, such as pedestrians will also be improved, as they will be less likely to step into the path of the cyclist.

The attachment means are preferably such that the device can be detachably secured to a cycle wheel and may be in the form of one or more snap-action devices which can be snapped onto, and grip, at least one spoke of the cycle wheel. If the device is attached to a single spoke, then rotation of the wheel may tend to throw the device radially outward with the risk of the device at some stage fouling the brake or other mechanism associated with the wheel in question. Accordingly, the attachment means are preferably in the form of a pair of opposed lugs extending from the housing and arranged to be engageable with respective spokes of an adjacent pair. In as much as the spokes of the cycle wheel radiate from the hub, then an adjacent pair of spokes diverge radially outwardly with respect to each other, whereby when a device is fixed therebetween, it will remain in the selected position which will be dictated by the distance between the respective attachment means. It will be appreciated that variation of the distance between the attachment means will allow devices to be placed at different distances from the hub of the wheel, whereby two or more concentric circles of light will, in use, be generated.

If a wheel is fitted with so-called disc covers which obscure the spokes, the attachment means may be such as to cooperate with a disc cover so as to mount the device thereon.

If two or more lamp means are provided in a given device and are arranged to be spaced along a radius of the cycle wheel when the device is mounted thereon, then each device of itself can generate a plurality of concentric circles of light and these can be of different colors.

The movable contact of the switch means may be in the form of a coiled spring since this combines resilience with robustness. The spring may be frustoconical and may be anchored at one end to one electrical terminal and provided at the other end with a head to provide an increased mass at that end, the head providing the moving contact which is engageable with the fixed contact. The head of the spring may be provided by a plurality of turns of the spring itself of smaller pitch than the rest of the spring, and/or by a metallic pellet secured to that end of the spring. The fixed contact with which the movable contact is engageable may be substantially cylindrical with the movable contact mounted therewithin. Such an arrangement ensures electrical contact between these two elements irrespective of the precise direction of relative movement therebetween. Depending on how the movable contact is oriented within the device, and thus oriented relative to the cycle wheel when attached thereto, the movable contact may move under centrifugal or centripetal force.

In a preferred embodiment, the electrical power supply in the form of a battery is mounted on a plate which in turn is pivotally mounted in the housing against resilient means, whereby the battery is used to provide a mass which is acted upon by centrifugal force, in use of the device, so as to rotate the plate. The plate carries the movable contact which is co-operable with the fixed contact to complete the electrical circuit and energize the lamp. With this arrangement it is possible to provide override means in the sense of being able to hold the plate against pivotal movement and thus prevent engagement between the movable and fixed electrical contacts, whereby the battery can be conserved during daylight hours, for example. In addition, or instead, the plate can be held in a pivoted position in which the moving and fixed electrical contacts are engaged, and hence the electrical lamp energized. Thus the device can be permanently switched on which may be advantageous during hours of darkness so that the device will be operative even when the cycle is stationary. The override means may comprise one or a pair of projections provided on a portion of the housing which is rotatable relative to another portion, the or each projection being engageable with the plate to effect the desired movement thereof.

The housing may be formed from two portions which are a snap fit together to provide a substantially watertight housing and the whole housing, or one portion thereof may be made translucent. Alternatively, one or more translucent windows may be provided in the housing. With a two-part housing the translucent windows or housing portions may be of different colors.

Alternatively, the housing may be a three-part construction, comprising a base portion and two translucent portions which are a snap fit on respective sides of the base portion.

The safety device may incorporate a whistle to augment the safety aspect, whereby both audible and visual warnings of the presence of a cycle will be provided.

According to a second aspect of the present invention there is provided a safety device for a cycle comprising a housing with at least a translucent window provided therein, an electrical power supply mounted within the housing, an electrical lamp connected to the power supply via switch means, and means provided on the housing for attaching the device to a wheel of a cycle.

BRIEF DESCRIPTION OF THE DRAWINGS

Safety devices according to the present invention will now be described in greater detail, by way of example, with reference to the accompanying drawings, in which.

DESCRIPTION OF THE ILLUSTRATED EMBODIMENTS

Figure 1:
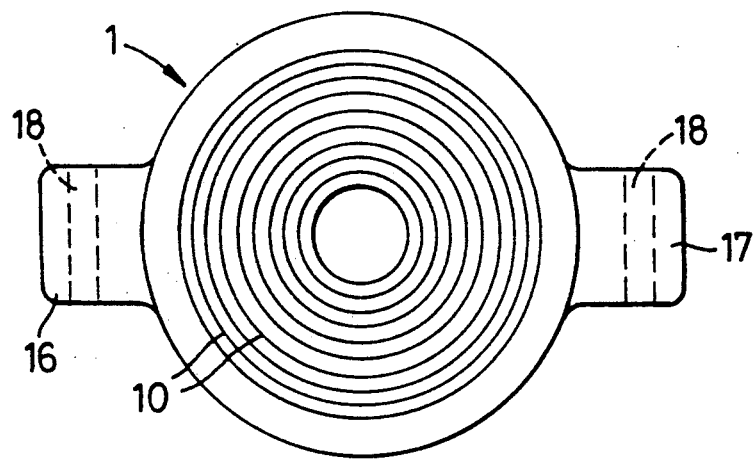
FIG. 1 is a plan view of one embodiment of the invention.

The safety device comprises a two-part housing having what will be referred to as a lower portion 2 and an upper portion 3 releasably attachable together to form a closed, generally cylindrical housing. Each housing portion 2,3 is provided on its main internal surface with a series of concentric rings 21 to form a Fresnel lens. The lower portion 2 is provided with a battery compartment 4, accommodating a battery 5. Two opposed walls 6 and 7 of the battery compartment 4 are provided with respective electrical contact 8 and 9 engageable by the positive and negative terminals of the battery 5. The contact 8 is extended, and provided with an upstanding member 10 to receive one end of a movable contact 11 of switch means. Spaced from the contact 9 is a substantially cylindrical fixed contact 12 also forming part of the switch means and within which is received the other end of the movable contact 11.

Figure 5:
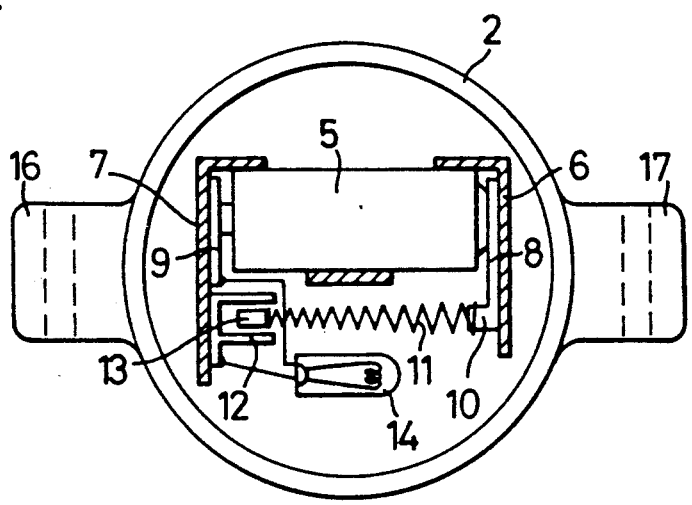
FIG. 5 is a plan view of the device of FIG. 1 with one half of a housing removed.

The movable contact 11 is in the form of a coiled spring (FIG. 5) which is frusto-conical in shape, the end of greater diameter being attached to the upstanding member 10 of the contact 8 in a manner to provide a good permanent electrical contact therebetween. The spring may be soldered in position on the member 10 if desired. The smaller diameter end of the movable contact 11 is provided with a greater mass per unit length than the rest of the contact by way of having a plurality of turns of the spring of smaller pitch than the rest of the spring and/or by being provided with a head in the form of a metallic pellet, this end of greater mass being indicated generally at 13. A lamp in the form of an LED 14 is connected in series with the switch means provided by the movable and fixed contacts 11 and 12, with one terminal being attached to the contact 9 and the other to the fixed contact 12.

Figure 3:
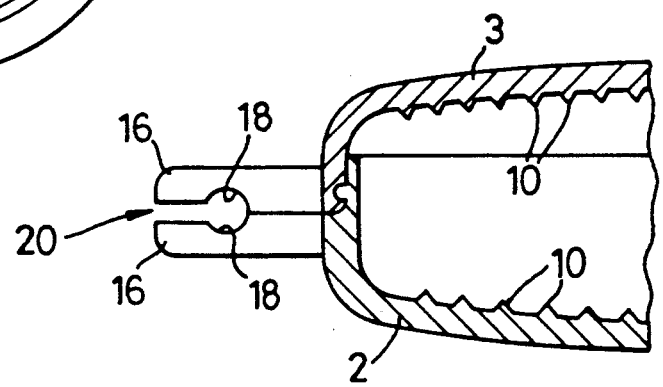
FIG. 3 is an enlarged detail, partly in section, of FIG. 2.
Figure 2:
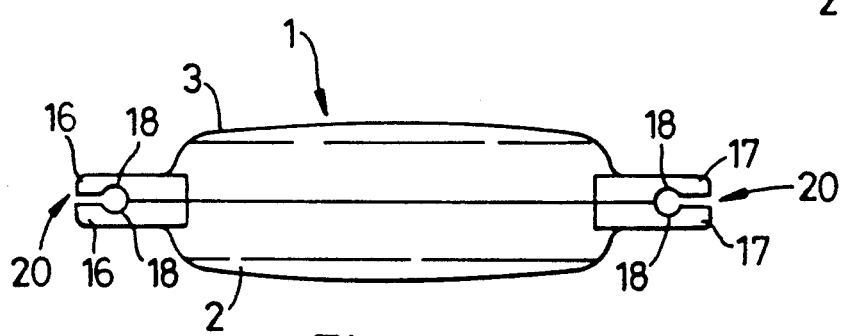
FIG. 2 is a side view of the embodiment of FIG. 1.
Figure 4:
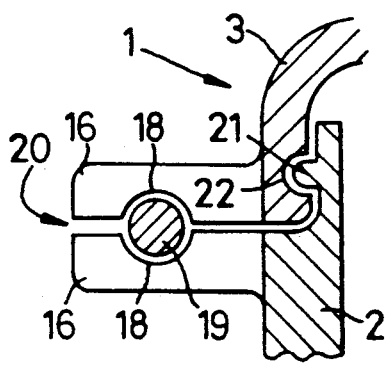
FIG. 4 is a further enlarged detail of FIG. 3.

Both the lower and upper portions 2 and 3 of the housing 1 are provided with a pair of opposed lugs or wings 16 and 17, respectively, each lug being provided with a groove 18 of substantially semicircular cross-section, the two grooves and the facing lugs of the upper and lower portions complementing each other to form a substantially circular housing to receive the spoke 19 (FIG. 4) of a wheel (not shown) when the device is fitted to the latter. The grooves 18 are inclined to accommodate the divergence of pair of adjacent spokes 19 to which, in use, the device is fitted. It will be seen from FIGS. 3, 4 and 5 that the lugs 16 and 17 of each pair are spaced apart at their outer ends in order to provide a lead-in portion 20 for the cycle wheel spoke 19, the latter snapping in to the cylindrical housing provided by the aligned grooves 18. The lower and upper portions 2 and 3 of the housing 1 are a snap fit together, the lower portion being provided with a circumferential rib 21 and upper portion being provided with a complementary circumferential groove 22 which cooperates with the rib to provide a substantially watertight housing. It will be appreciated that the rib 21 may be provided on the upper part of the housing and the groove on the lower part of the housing.

The housing 1 may be moulded from a synthetic plastics material in order to make it robust and a material such as polypropylene may be used in order to provide some flexibility to assist in the snap action of the lugs when the device is fitted to, and removed from, the spokes of a cycle. The housing 1 is either made entirely translucent or provided with a translucent window which the LED 14 is aligned. In the illustrated embodiment the whole of the housing portions 2 and 3 are translucent. Clearly, different colors of illumination can be provided by differently colored materials. In this respect, the lower and upper portions 2 and 3 of the given housing may be made from different colored materials so that the circle of light generated, in use, will be of different colors when viewed from opposite sides of the cycle.

In use of the device, the pairs of lugs 16 and 17 are snapped onto the appropriate spoke of a pair of adjacent spokes of a cycle wheel, the distance between the grooves 18 in the opposed lugs dictating the position on the cycle wheel at which the device can be disposed and once in position, the device will not move radially inwardly or outwardly on rotation of the wheel. When the cycle wheel is rotated, the spring contact 11 is thrown into contact with the fixed contact 12, thus energizing the LED 14 and producing a circle of light around the wheel as the wheel rotates, the light being concentrated by the Fresnel lenses formed by the rings 10. As soon as the rotational speed of the wheel drops below that required to engage the movable and fixed contacts 11 and 12, the contact is thus broken and the LED deenergized, whereby there is no drain on the battery power when the device is inoperative which condition is automatically achieved with any manual intervention.

Turning now to FIGS. 6 to 9, these illustrate a preferred embodiment of the invention which comprises a body portion 22 to which are fitted, on each side, a Fresnel lens 23 and 24 which are essentially the same as the lenses 2 and 3 of the first embodiment except that they are flat and not domed and snap on to the base portion rather than to each other. A pair of opposed lugs or wings 25 is provided as before but in this embodiment, each lug comprises two spaced upper portions 27 and an intermediate lower portion 28 which provides some flexibility for engaging the associated spoke of a bicycle wheel. The upper and lower lug portions 27,28 are provided with aligned grooves 29, the access of the overall groove in each lug being inclined to match the angle of the cycle spoke. If desired, two or more grooves may be provided in the lugs spaced from each other so that a device can be fitted at various locations along a pair of given spokes.

Within the body 22 there is mounted a plate 31, the plate being pivotally mounted with respect to the body 22 by a pivot 32. The side opposite the pivot 32, the plate 31 is provided with an extension 33 which is disposed between spaced extensions 34 and 35 provided on the body 22 so as to locate and guide the plate for pivotal movement with respect to the body. The plate 31 is provided with a recess 37 which accommodates a small bulb 36 which is preferably a wide angle 1.5 v neon bulb. The plate 31 is also provided with a battery compartment 38 which accommodates a battery 39 which is preferably a 1.5 v N size alkaline battery. One end of the battery compartment 38 is provided with an electrical terminal 41 in the form of a spring which is in permanent engagement with the negative end of the battery 39 and which is connected by a wire 42 to one terminal of the bulb 37. A second electrical terminal 43 is provided on the inner edge of the body 22 and this connected by a wire 44 to the second terminal of the bulb 37. The wires 42 and 43 may be disposed on the underside of the plate 31.

A spring 45 is disposed between the inner edge of the body 22 and a recess 46 in the plate 31. The rate of the spring 45 is chosen so as to provide engagement of the positive terminal of the battery 39 with the terminal 43 at a given rotational speed of the cycle wheel. An internal projection 47 and external projection 48 are provided on the Fresnel lens 23 for a purpose to be described.

The device is fitted to the spokes of a cycle wheel in the same manner as the embodiment of FIGS. 1 to 5, namely by engaging a pair of spokes in the respective grooves formed in the lugs 25. With the Fresnel lens 23 in the position shown in FIG. 8 of the drawings, the plate 31 will pivot under the action of centrifugal force when the cycle wheel is rotated, thus moving the positive end of the battery 39 into engagement with the electrical terminal 43, once a given rotational speed of the wheel is reached, and thus completing the circuit to energize the bulb 37.

Figure 6:
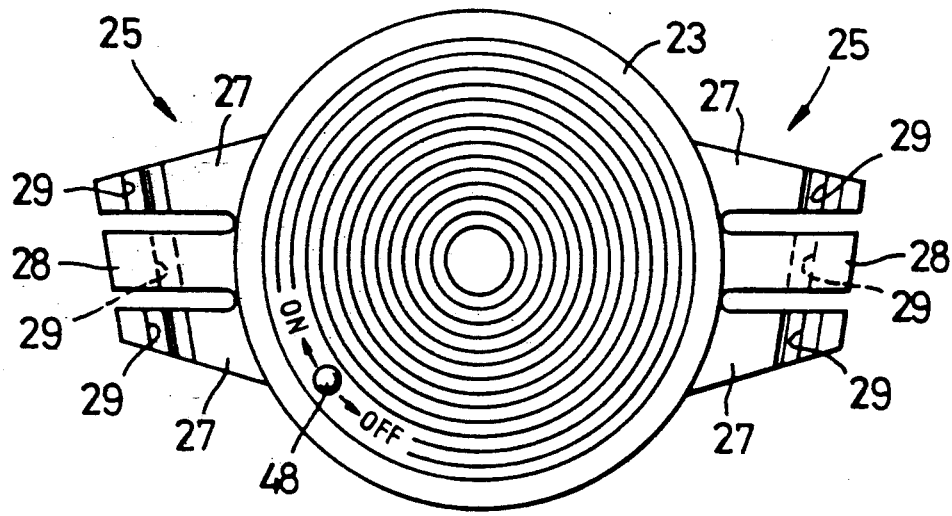
FIG. 6 is a plan view of an alternative, and preferred, embodiment of the invention.
Figure 7:
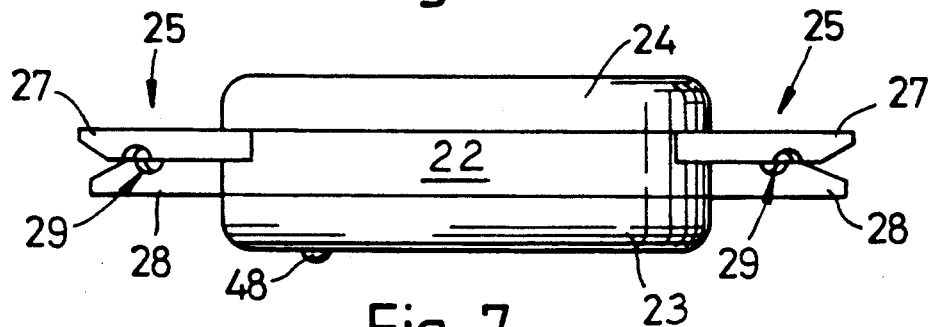
FIG. 7 is a side view of FIG. 1.
Figure 8:
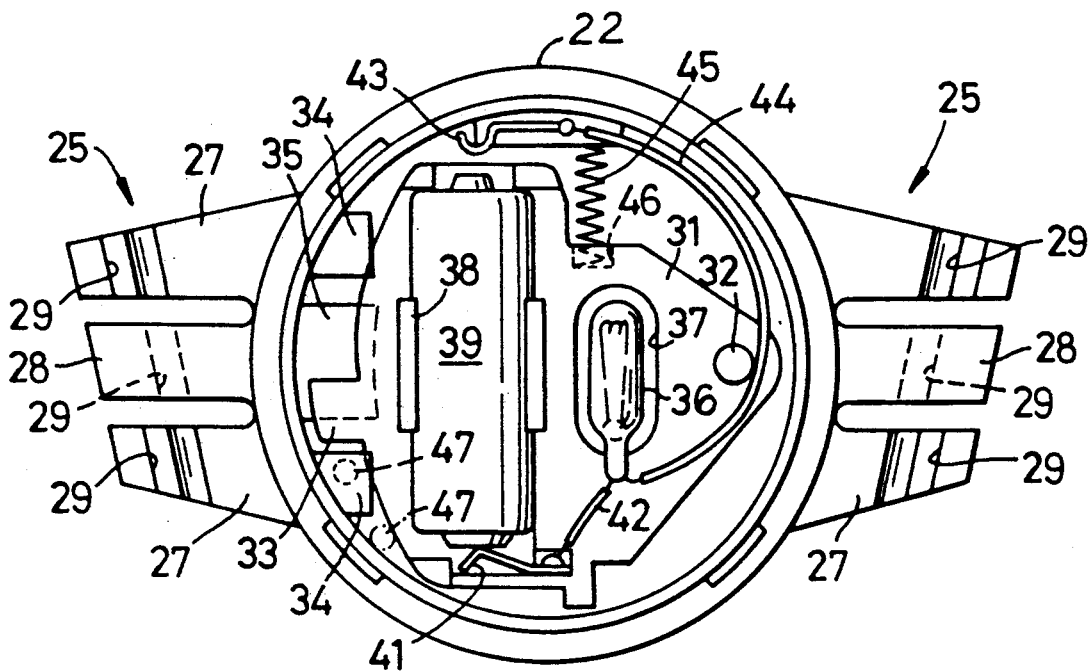
FIG. 8 is a view similar to that of FIG. 6 but with a cover removed and showing the device in one position.
Figure 9:
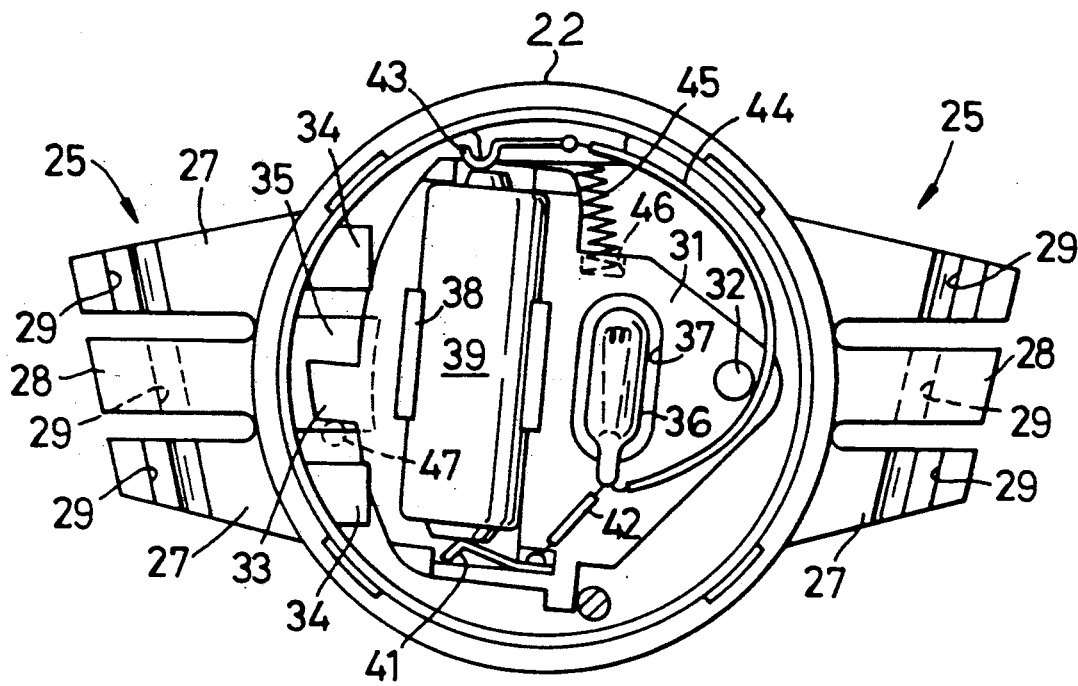
FIG. 9 is a view similar to that of FIG. 8 but showing the device in another position.

The Fresnel lens 23 although being a snap fit onto the body 22 is nevertheless rotatable relative thereto and when the lens 23 is rotated clockwise as seen in FIG. 6 of the drawings, the projection 47 thereon will engage the projection 33 on the plate 31 and thus pivot the latter, whereby the battery positive terminal (acting as the movable contact of the switch) is moved into contact with the electrical terminal 43 so that the bulb 37 is permanently energized. This is a useful feature because it means that the device can be illuminated even when the cycle is stationary, this being especially useful during the hours of darkness. The frictional engagement between the lens 23 and the body 22 is such as to retain these two components in the adjusted position, whereby the bulb 37 will remain energized until the lens is rotated to the position shown in FIG. 8, whereby the spring 45 will return the plate 31 also to the position of FIG. 8. If the lens 23 is rotated in the opposite direction, the projection 47 engages the body of the plate 31 which is thus prevented from pivotal movement so that the device is rendered inoperative which may be useful during daylight hours, for example, when the illumination of the device will be barely visible and the battery can thus be conserved. This position of the projection 47 is indicated in phantom in FIG. 8. Rotation of the lens 23 is facilitated by the pip or projection 48 which is an external projection in line with the internal projection 47.

With the arrangement of the preferred embodiment, the use of the mass of the battery 39 and the plate 31 assists greatly in making a good contact between the positive terminal of the battery and the fixed electrical terminal 43 in use of the device.

In as much as means can be provided for permanently energizing the lamp or rendering the device inoperative, then according to a second aspect of the invention, a device can be provided which fits to the wheel of a cycle and which comprises ON/OFF switch means, whereby advantage is not taken of the centrifugal force generated upon rotation of the device when fitted to the cycle wheel. Such an arrangement can take advantage of the other features of the first embodiment of the invention, for example those described in accordance with the embodiments shown in the drawings.

It will also be appreciated that a cycle wheel may be fitted with more than one device at the same or different distance from the hub as the existing device or devices. If a plurality of devices are provided at different radial distances from the hub, then a plurality of concentric circles of light will be generated and the color thereof may be varied by having different colored housing or translucent windows, for example. Alternatively, or in addition, each device may be fitted with more than one LED and if arranged to be spaced apart along the radius of the cycle wheel, when the device is fitted thereto, then again, concentric circles of light will be generated by one and the same device. Also, more powerful light sources than LED's may be employed, for example halogen lamps, with the employment of appropriate power supplies. One or both lenses may be provided with a light-reflective element to enhance safety or one lens replaced by a reflector.

Disc covers for wheels are known which clip on to one or more spokes and thus obscure the same. These covers help to reduce turbulence and hence make the cycle more streamline. Disc wheels are also known, which wheels are spokeless and the discs replace the same. It will be apparent that the attachment means of the safety device is readily adapted to mount the device on these various discs. For example, the device may be attached to a disc using bolts or screws which may pass through the lugs or wings 16,17. It is a much simpler matter to attach a plurality of devices to a given disc at different distances from the wheel center because no account has to be taken of the divergence of a given pair of spokes from the wheel center.

It will be seen that the present invention affords a reliable safety device for fitting to the wheel of a cycle and which will automatically be rendered operative on rotation of the wheel and automatically rendered inoperative when the cycle is not in use. The illuminative effect afforded by the device according to the present invention is attractive and will encourage children to use the same, allowing them to have their own color coding, for example.

The safety device may be augmented to provide an audible warning of the presence of a cyclist by fitting the housing with a whistle, for example, which is rendered operative by air passing therethrough as the cycle wheel is rotated. Thus, the safety effect of the device is enhanced by having both audible and visual warnings.

I claim:

1. A safety device for a cycle, comprising a housing with at least a translucent window provided therein, an electrical power supply mounted within the housing, an electrical lamp connected to the power supply via switch means, one contact of which is movable in response to rotary motion of the housing into engagement with a fixed contact, the lamp being energized when the moving contact is in engagement with the fixed contact, and means provided on the housing for attaching the device to a cycle wheel, the housing comprising a body portion having pivotally mounted therein a plate fitted with a lamp compartment housing the lamp and a battery compartment housing the power supply in the form of a battery, one terminal of the battery being in permanent engagement with one terminal of the lamp and the other terminal of the battery being engageable with a contact on the body connected to the other terminal of the lamp, when the plate is pivoted in use of the device.

2. A device according to claim 1, wherein the attachment means are such that the device can be detachably secured to a cycle wheel.

3. A device according to claim 2, wherein the attachment means are in the form of one or more snap-action devices which can be snapped onto, and grip, at least one spoke to a cycle wheel.

4. A device according to claim 3, wherein the attachment means are in the form of a pair of opposed lugs extending from the housing and arranged to be engageable with respective spokes of an adjacent pair of spokes of a cycle wheel.

5. A device according to claim 4, wherein the lugs have a groove of generally circular cross-section extending therethrough, a lead-in portion being provided in order to assist in the engagement and disengagement of the lugs with a spoke of a cycle wheel.

6. A device according to claim 5, wherein the grooves are inclined with respect to each other to match the relative inclination of a pair of cycle wheel spokes.

7. A device according to claim 1, wherein the at least one translucent window comprises a plurality of portions detachably securable together, to provide a substantially water-tight housing.

8. A device according to claim 1, wherein the at least one translucent window comprises a lens portion attachable to one side of the body portion.

9. A device according to claim 8, wherein the plate is provided with a first projection engageable with a projection on the lens portion, on relative rotational movement between the lens portion and the body portion, to pivot the plate such that said other terminal of the battery engages the contact, whereby the lamp is permanently energized.

10. A device according to claim 9, wherein the lens portion is rotatable so as to engage the projection with the plate to prevent pivotal movement of the plate and hence render the device inoperative.

11. A device according to claim 1, wherein the plate is spring loaded.

12. A device according to claim 1, wherein at least the translucent window of the housing is provided with a Fresnel lens.

13. A device according to claim 1, wherein at least two electrical lamps are provided and are spaced along a radius of the cycle wheel when the device is mounted thereon, whereby, in use, the device generates a plurality of concentric circles of light.

14. A device according to claim 1 and further comprising audible warning means, whereby, in use, the device provides both audible and visual warning of the presence of a cyclist.

15. A device according to claim 14, wherein the audible warning device is a whistle which is rendered operative by air passing therethrough on rotation of the device when fitted to a cycle wheel.

16. A device according to claim 1, wherein electrical contact between the movable and fixed contacts of the switch means is achieved under centrifugal or centripetal force.

17. A device according to claim 1, wherein the at least one translucent window comprises two lens portions attached to either side of the body portion.

18. A safety device for a cycle, comprising a housing with at least a translucent window provided therein, an electrical power supply mounted within the housing, an electrical lamp connected to the power supply via switch means, one contact of which is movable in response to rotary motion of the housing into engagement with a fixed contact (443), the lamp being energized when the moving contact is in engagement with the fixed contact, and means provided on the housing for attaching the device to a cycle wheel, the movable contact of the switch means being in the form of a coiled spring having one end anchored to one electrical terminal of the power supply and the other end being provided with a head to provide an increased mass at that end, the fixed contact of the switch means being substantially cylindrical, with the head of the movable contact disposed therewithin.

* * * * *